United States Patent
Tang et al.

(10) Patent No.: US 8,026,659 B2
(45) Date of Patent: Sep. 27, 2011

(54) WAVELENGTH CONVERTING MATERIAL AND USE OF SAME

(75) Inventors: Yu-Sheng Tang, Kaohsiung County (TW); Ru-Shi Liu, Taipei County (TW); Shu-Fen Hu, Taipei County (TW); Chien-Yuan Wang, Kaohsiung County (TW)

(73) Assignee: Epistar Corporation, Hsinchu (TW)

( * ) Notice: Subject to any disclaimer, the term of this patent is extended or adjusted under 35 U.S.C. 154(b) by 214 days.

(21) Appl. No.: 12/453,014

(22) Filed: Apr. 28, 2009

(65) Prior Publication Data

US 2009/0267488 A1  Oct. 29, 2009

(30) Foreign Application Priority Data

Apr. 28, 2008 (TW) ................... 97116147 A

(51) Int. Cl.
*H05B 33/14* (2006.01)
(52) U.S. Cl. .............. 313/501; 313/503; 313/506
(58) Field of Classification Search ........... 257/40, 257/72, 98–100, 642–643, 759; 313/498–512; 315/169.1, 169.3; 427/40, 72, 98–100, 642–643, 427/759; 428/690–691, 917; 438/26–29, 438/34, 82, 455; 445/24–25
See application file for complete search history.

(56) References Cited

U.S. PATENT DOCUMENTS

| | | | | |
|---|---|---|---|---|
| 3,448,056 | A * | 6/1969 | Chenot | 252/301.4 R |
| 2006/0138435 | A1* | 6/2006 | Tarsa et al. | 257/89 |
| 2008/0067534 | A1* | 3/2008 | Hsieh et al. | 257/98 |
| 2008/0265269 | A1* | 10/2008 | Yoo et al. | 257/98 |
| 2009/0095970 | A1* | 4/2009 | Yen et al. | 257/98 |

* cited by examiner

*Primary Examiner* — Nimeshkumar Patel
*Assistant Examiner* — Donald Raleigh
(74) *Attorney, Agent, or Firm* — Bacon & Thomas, PLLC

(57) ABSTRACT

This invention discloses a wavelength converting material. The wavelength converting material comprises a metal haloaluminate compound phosphor with a chemical formula $M_{w-p}Al_yO_zX_q:R_p$, wherein M is at least one element selected from the group of Be, Mg, Ca, Sr, Ba and Zn; X is at least one element selected from the group of F, Cl, Br, and I; R is one or more elements selected from the group of the transition metals and at least one element selected from the lanthanide series. Because the emitting wavelength of the metal haloaluminate compound phosphor is 550~650 nm which is from the green to the red light spectrum, the white light mixed by the converted light of the metal haloaluminate phosphor and the blue light has better color rendering index. Besides, this invention also discloses the optoelectronic devices comprising the metal haloaluminate compound phosphor.

17 Claims, 6 Drawing Sheets

WAVELENGTH CONVERTING MATERIAL AND USE OF SAME

The present application claims the right of priority based on Taiwan Application Serial Number 097116147, filed on Apr. 28, 2008, the disclosure of which is incorporated herein by reference in its entirety.

BACKGROUND

1. Technical Field

The present disclosure provides a wavelength converting material, particularly the material relating to metal haloaluminate compound, and the application thereof.

2. Description of the Related Art

Many researches have actively aimed at the development of illumination source by replacing traditional fluorescent light source with light-emitting diode (LED) that produces white light similar to solar emission. The popular white LED chip technology uses a blue LED that emits light with wavelength from 440 nm to 460 nm to excite yellow phosphors such that the blue light is mixed with the yellow light to produce white light. Although the foregoing method owns the advantages of process simplicity and cost effectiveness, the color saturation and color rendering index (CRI) of the produced white light are still distinct from the solar emission.

Within recent years, another research has developed to use ultra-violet (UV) LED that emits wavelength from 360 nm to 400 nm to excite red, green, and blue phosphors, and then mixed into white light. The abovementioned method has advantages of high luminous efficiency, high CRI, and being capable of associating with a variety of phosphors. However, the process is more difficult for adequately mixing several sorts of phosphors for controlling the characteristics of the generated white light.

SUMMARY OF THE DISCLOSURE

One aspect of the disclosure is to provide a wavelength converting material comprising a phosphor with metal haloaluminate compound with a chemical formula $M_{w-p}Al_yO_zX_q:R_p$ (or $(M_{w-p}R_p)Al_yO_zX_q$), wherein w,y,z,q>0, 0.005<p<0.5, and q=2w+3y−2z; wherein M is at least one element selected from the group of Be, Mg, Ca, Sr, Ba and Zn; X is at least one element selected from the group of F, Cl, Br, and I; R is one or more elements selected from the group of the transition metals and at least one element selected from the lanthanide series.

Another aspect of the disclosure is to provide a phosphor with metal haloaluminate compound capable of radiating yellow light with wavelength from 550 to 650 nm, and having a FWHM (full width at half maximum) value around 120 nm for being mixed with blue light to achieve white light with better CRI.

Another aspect of the disclosure is to apply a phosphor with metal haloaluminate compound to an optoelectronic device. The optoelectronic device comprises a light-emitting stack and a wavelength converting layer containing metal haloaluminate compound.

Another aspect of the disclosure is to provide an optoelectronic device equipped with phosphor with metal haloaluminate compound, comprising a printed circuit board (PCB), an LED chip formed on the PCB, a transparent encapsulating material formed on the LED chip and the PCB, wherein the transparent encapsulating material is embedded with wavelength converting material comprising at least metal haloaluminate compound.

DETAILED DESCRIPTION OF THE EMBODIMENTS

This disclosure provides a wavelength converting material and the use of the same. For better and complete understanding of the present disclosure, please refer to the following descriptions along with FIG. 1 to FIG. 8.

The present disclosure discloses a wavelength converting material comprising a metal haloaluminate compound phosphor with a chemical formula $M_{w-p}Al_yO_zX_q:R_p$ (also known as $(M_{w-p}R_p)Al_yO_zX_q$), wherein w,y,z,q>0, 0.005<p<0.5, and q=2w+3y−2z; wherein M is at least one element selected from the group of Be, Mg, Ca, Sr, Ba and Zn; X is at least one element selected from the group of F, Cl, Br, and I; R is one or more elements selected from the group of the transition metals and at least one element selected from the lanthanide series.

The metal haloaluminate compound as disclosed in the present disclosure can be synthesized by solid-state reaction, chemical synthesis, citrate gelation process, or spray pyrolysis. This embodiment is exemplified by solid-state reaction for the illustration of synthesis of $(Sr_{3-x}Eu_x)(Al_2O_5)Cl_2$ or $Sr_{3-x}Al_2O_5Cl_2:Eu_x$. The method includes steps of preparing a first reactant comprising Sr, a second reactant comprising Al, a third reactant comprising Cl, and a fourth reactant comprising Eu with stoichiometrical amount. Then the first reactant, the second reactant, the third reactant, and the fourth reactant are thoroughly mixed and ground in a mortar. Next, the mixed reactants are put into a crucible made of aluminum oxide, and then annealed under reduction atmosphere of 1000~1300° C. for 2~6 hours in a tubular furnace. The reduction atmosphere can be embodied by mixing hydrogen ($H_2$) and nitrogen ($N_2$) in a ratio of 5% to 95%. Afterwards, the furnace temperature is raised to 1300° C. at a ramping speed of 5° C./min., and the reduction reaction is proceeded for 3 hours isothermally around 1300° C. Lastly, the furnace temperature is cooled to room temperature at a cooling speed of 5° C./min. After reductive sintering, the phosphor powder of the metal haloaluminate compound $(Sr_{3-x}Eu_x)(Al_2O_5)C_{12}$ is achieved after grinding.

The first reactant comprising Sr is selected from the group consisting of $SrCO_3$, $Sr(NO_3)_2$, and SrO, and can be made by directly oxidizing Sr. The second reactant comprising Al can be $Al_2O_3$. The third reactant comprising Cl can be $SrCl_2 \cdot 6H_2O$, or $SrCl_2$. The fourth reactant comprising Eu is selected from the group consisting of $Eu_2O_3$, $Eu(NO_3)_3 \cdot 5H_2O$, $Eu(NO_3)_3$ and $EuCO_3$, and can be made by directly oxidizing Eu.

Figure 1:
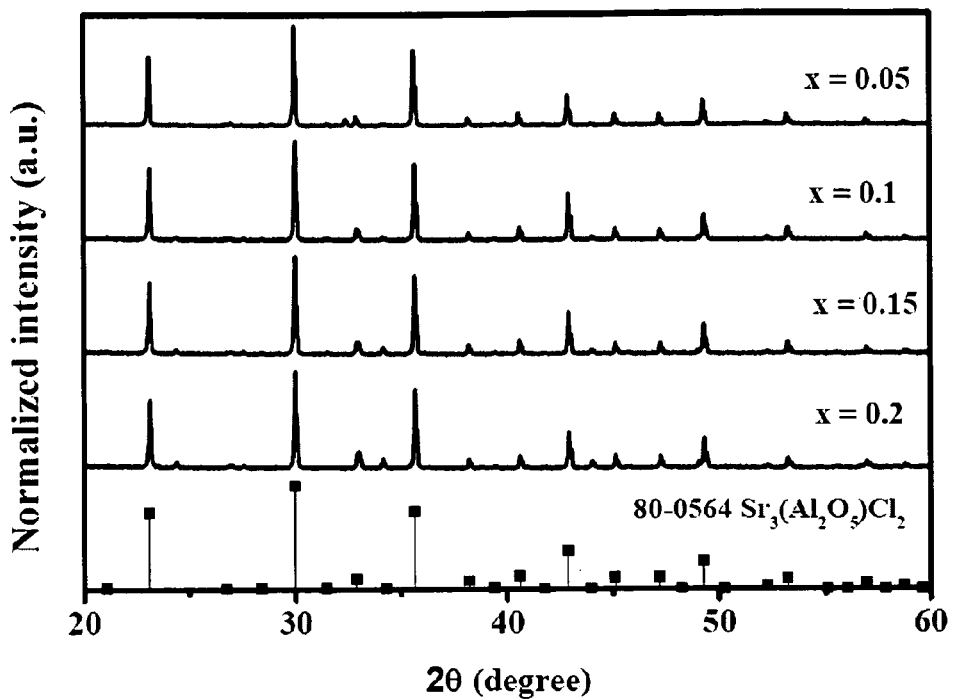
FIG. 1 shows an XRD diagram of one sample of $(Sr_{3-x}Eu_x)(Al_2O_5)C_{12}$ in accordance with one embodiment of the present disclosure.

FIG. 1 shows an XRD diagram of one sample of $(Sr_{3-x}Eu_x)(Al_2O_5)C_{12}$ in accordance with embodiments of the present disclosure. From the comparison between the sample made by the present disclosure and the standard sample of metal haloaluminate compound (Sr3(Al2O6)Cl2, ICSD No.: 68365) as shown in FIG. 1, the structure in accordance with the present disclosure is orthorhombic.

Figure 2:
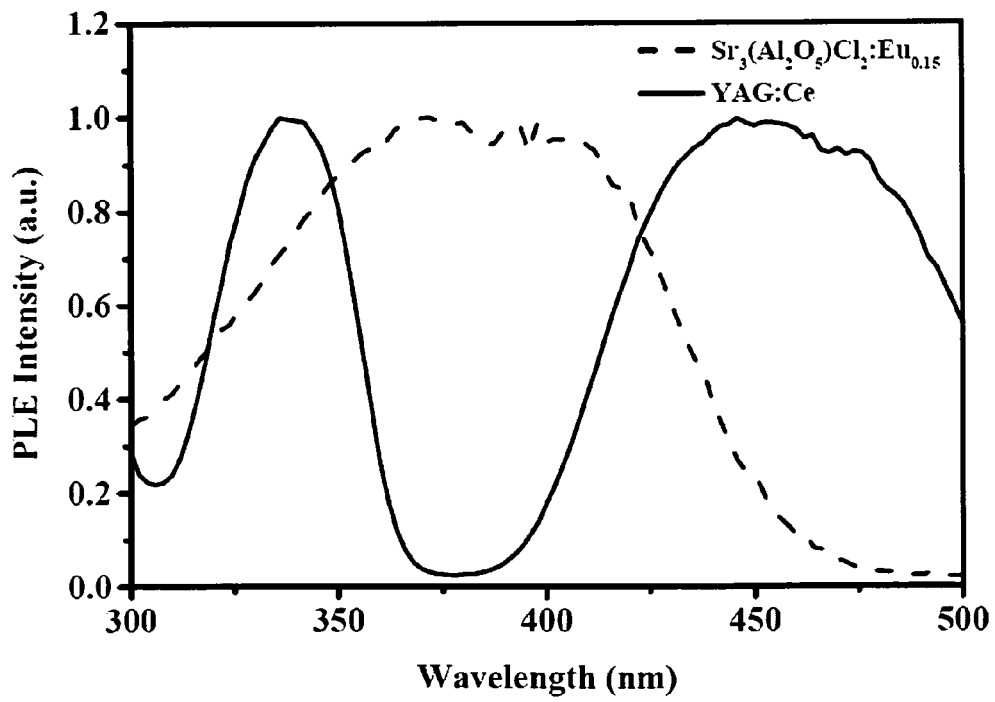
FIG. 2 shows the spectrums of UV-visible radiation sources for the phosphor of $(Sr_{2.85}Eu_{0.15})(Al_2O_5)C_{12}$ in accordance with the present disclosure and the commercial phosphor of $Y_3A_5O_{12}:Ce^{3+}$.

FIG. 2 shows the spectrums of UV-visible radiation sources for the phosphor of $(Sr_{2.85}Eu_{0.15})(Al_2O_5)C_{12}$ in accordance with the present disclosure and the commercial phosphor of $Y_3Al_5O_{12}:Ce^{3+}$ (YAG:Ce). The phosphor of $(Sr_{2.85}Eu_{0.15})(Al_2O_5)C_{12}$ in accordance with the present disclosure is preferable to be excited by the ultra-violet (UV) light with wavelength spectrum ranging from 200 nm to 450 nm or UV to near-UV spectrum, more preferable from 300 nm to 430 nm, and most preferable from 360 nm to 420 nm to achieve better emitting characteristics.

Figure 3:
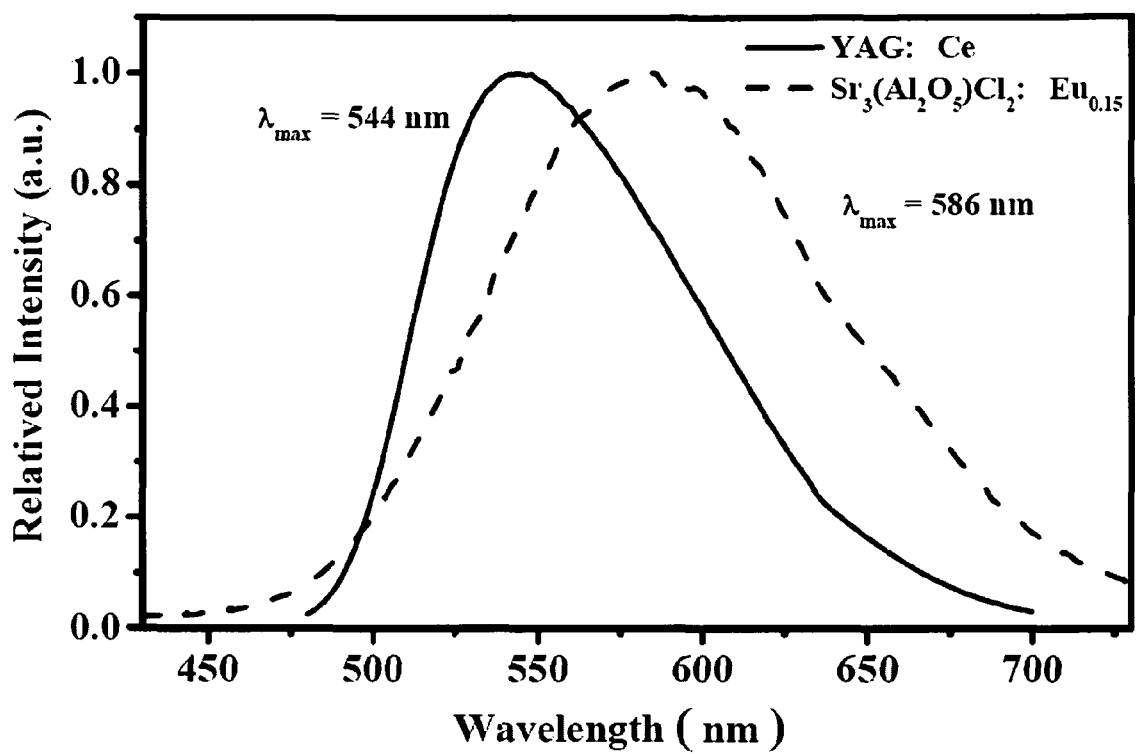
FIG. 3 shows the emitting spectrums of the phosphor of $(Sr_{2.85}Eu_{0.15})(Al_2O_5)C_{12}$ in accordance with the present disclosure and the commercial phosphor of $Y_3A_5O_{12}:Ce^{3+}$.

FIG. 3 shows the emitting spectrum of the phosphor of $(Sr_{2.85}Eu_{0.15})(Al_2O_5)Cl_2$ in accordance with the present disclosure and the commercial phosphor of YAG:Ce excited by UV light with wavelength of 370 nm. According to FIG. 3, the highest intensity for the phosphor $(Sr_{2.85}Eu_{0.15})(Al_2O_5)Cl_2$ radiating yellow light is around wavelength of 586 nm. The highest intensity for the commercial phosphor YAG:Ce radiating yellow light is around wavelength of 544 nm. The emitting wavelength of the disclosed phosphor with metal haloaluminate compound is closer to red light spectrum than that of YAG:Ce. Therefore, the yellow light radiated from the disclosed phosphor with metal haloaluminate compound can be mixed with blue light to achieve warm white light having lower color temperature, instead of the cold white light having higher color temperature resulted from YAG:Ce. Furthermore, according to FIG. 3, the full width at half maximum (FWHM) for YAG:Ce is about 100 nm, and the full width at half maximum (FWHM) for $(Sr_{2.85}Eu_{0.15})(Al_2O_5)Cl_2$ reaches to 120 nm thereby having a better color rendering index than that of YAG:Ce for being mixed into white light.

Figure 8:
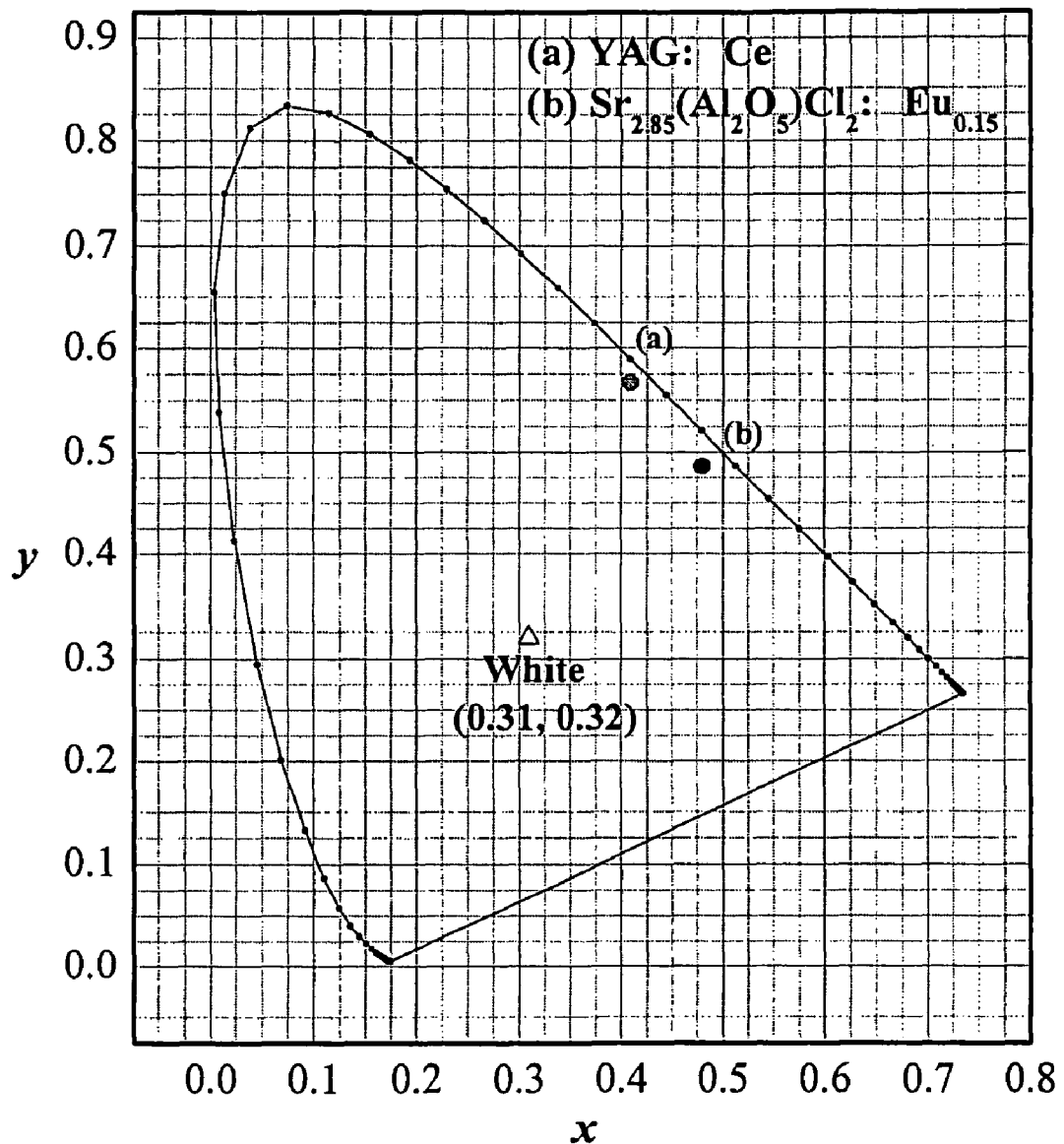
FIG. 8 shows the CIE1931 diagram and the chromaticity coordinates projected by $(Sr_{2.85}Eu_{0.15})(Al_2O_5)Cl_2$ and $Y_3A_5O_{12}:Ce^{3+}$.

FIG. 8 shows the CIE1931 chromaticity diagram and the chromaticity coordinates projected by $(Sr_{2.85}Eu_{0.15})(Al_2O_5)C_{12}$. Point a represents the location of YAG:Ce sample as disclosed in FIG. 3 on the chromaticity diagram with a coordinate of (0.4792, 0.4861). Point b represents the location of $(Sr_{2.85}Eu_{0.15})(Al_2O_5)Cl_2$ sample as shown in FIG. 3 on the chromaticity diagram with a coordinate of (0.4087, 0.5668). The triangle symbol represents the location of the theoretical white light with a coordinate of (0.31, 0.32). According to the location on the CIE diagram, The dominant wavelength of the phosphor made by the embodiment of the present disclosure is about 578 nm and closer to red light spectrum than that of YAG:Ce.

Figure 4A:
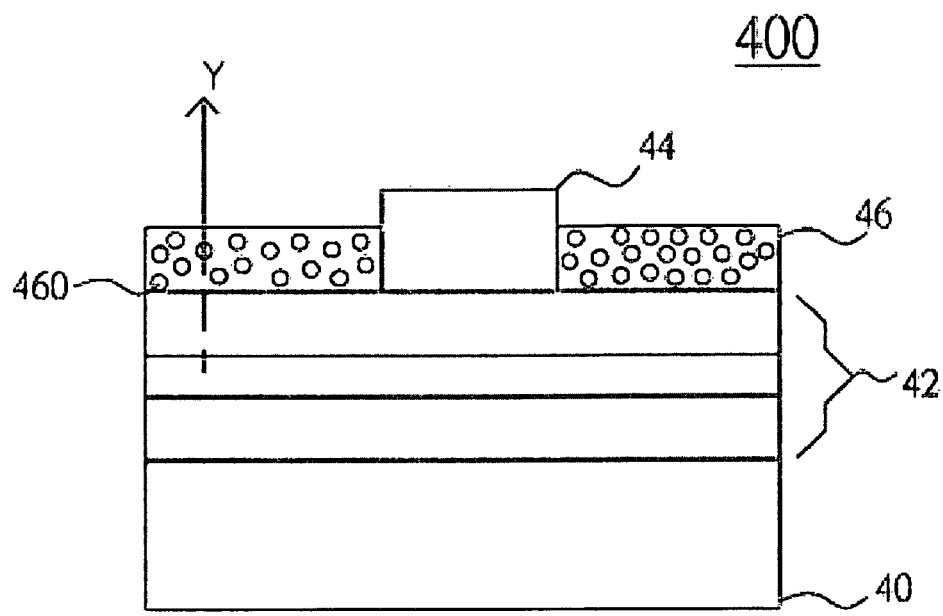
FIG. 4A shows an optoelectronic device in accordance with a first embodiment of the present disclosure.
Figure 4B:
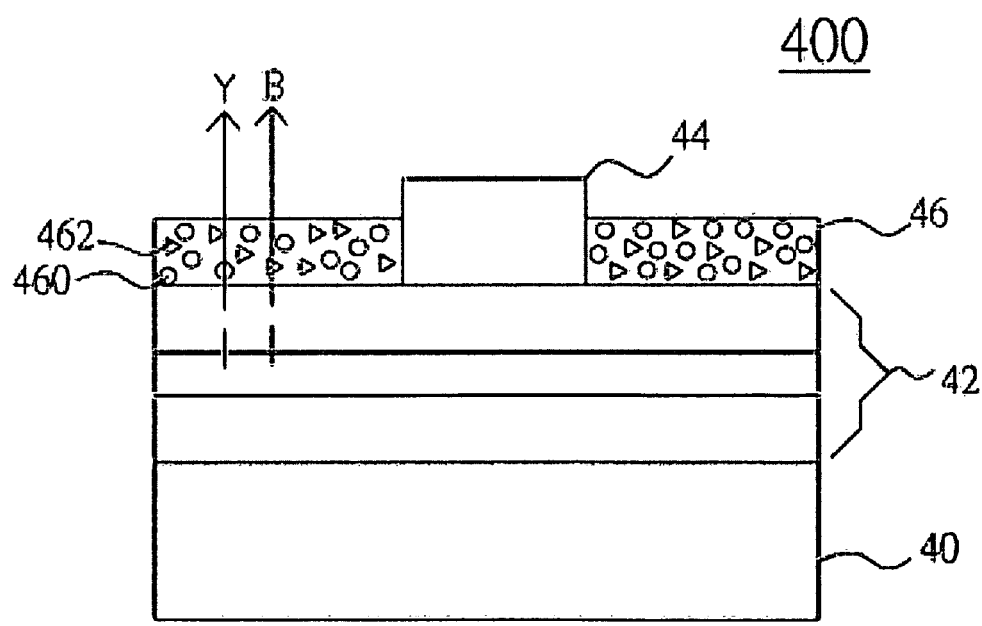
FIG. 4B shows an optoelectronic device in accordance with second embodiment of the present disclosure.

The disclosed phosphor with metal haloaluminate compound can be extensively applied to various optoelectronic devices such as light-emitting diode, plasma emission device, and other solid-state illumination device. FIG. 4A and FIG. 4B show embodiments of optoelectronic device associated with the disclosed phosphor with metal haloaluminate compound. FIG. 4A shows an optoelectronic device 400 comprising a substrate 40, a light-emitting stack 42 on the substrate, at least an electrode 42 on the light-emitting stack, and a wavelength converting material 46 covering the light-emitting stack. The light-emitting stack 42 emits UV or near-UV light having wavelength between 200 nm to 450 nm. The wavelength converting material 46 comprises the disclosed phosphor 460 with metal haloaluminate compound. The UV or near-UV light emitted from the light-emitting stack 42 is converted by the disclosed phosphor 460 of the wavelength converting material 46 to yellow light with wavelength between 550 nm to 650 nm. The optoelectronic device 400 can also be embodied as shown in FIG. 4B. The wavelength converting material 46 further comprises an additional phosphor 462 excited by UV light to radiate blue light. UV or near-UV light radiated by the light-emitting stack 42 is absorbed and then converted to yellow light by the yellow phosphor with metal haloaluminate compound and blue light by the phosphor 462 capable of radiating blue light by the excitation of UV light. The converted yellow light and the converted blue light are further mixed to produce white light. The phosphor capable of radiating blue light by the excitation of UV light comprises at least one material selected from the group consisting of $Si_3MgSi_2O_8:Eu$, $BaMgAl_{10}O_{17}:Eu$, $(SrBaCa)_5(PO_4)_3Cl:Eu$, and $Sr_4Al_{14}O_{25}:Eu$.

Figure 5A:
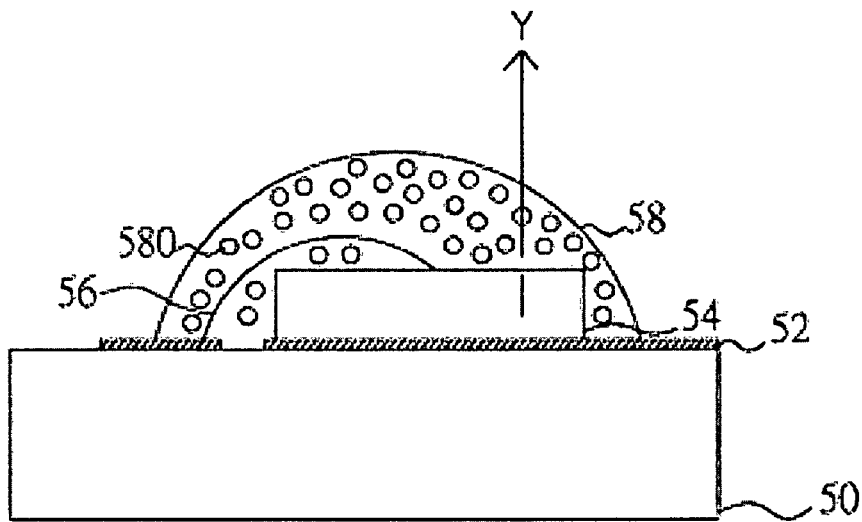
FIG. 5A shows an optoelectronic device in accordance with a third embodiment of the present disclosure.
Figure 5B:
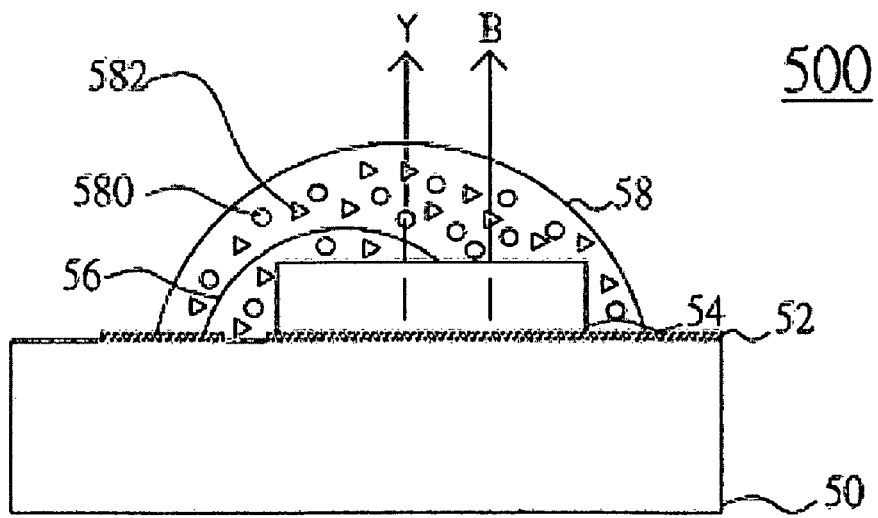
FIG. 5B shows an optoelectronic device in accordance with a fourth embodiment of the present disclosure.

FIG. 5A and FIG. 5B show another embodiments of optoelectronic device associated with the disclosed phosphor with metal haloaluminate compound. According to FIG. 5A, The optoelectronic device 500 comprises a printed circuit board 50 having at least one circuit 52, an LED chip 54 on the board 50 emitting UV or near-UV light with wavelength ranging from 200 to 450 nm, at least a metal wire 56 electrically connecting the LED chip 54 and the circuit 52, and a transparent encapsulating material 58 on the board 56 and covering the LED chip 56 and part of the circuit 52 and the metal wire 56. The transparent encapsulating material 58 comprises the disclosed phosphor with metal haloaluminate compound distributed therein. The light emitted by the LED chip 54 excites the phosphor 580 with metal haloaluminate compound, and is converted into yellow light having wavelength between 550 nm to 650 nm. The optoelectronic device 500 can also be embodied as shown FIG. 5B. The transparent encapsulating material 58 further comprises a phosphor 582 capable of radiating blue light by the excitation of UV light. UV or near-UV light emitted by the LED chip 54 is absorbed and then converted to yellow light by the phosphor 580 with metal haloaluminate compound and blue light by the phosphor 562 capable of radiating blue light by the excitation of UV light. The converted yellow light and the converted blue light are further mixed to produce white light. The phosphor capable of radiating blue light by the excitation of UV light comprises at least one material selected from the group consisting of $Si_3MgSi_2O_8:Eu$, $BaMgAl_{10}O_7:Eu$, $(SrBaCa)_5(PO_4)_3Cl:Eu$, and $Sr_4Al_{14}O_{25}:Eu$.

Figure 6:
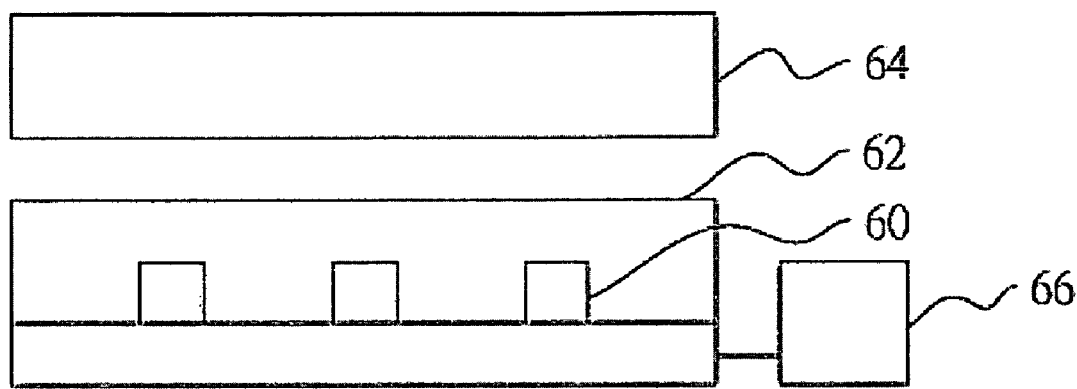
FIG. 6 shows a backlight module apparatus containing one embodiment of the present disclosure.

FIG. 6 shows a backlight module apparatus containing one embodiment in accordance with the present invention. The backlight module apparatus 600 comprises a light source 62 including an optoelectronic device 60 as described in any of the abovementioned embodiments in accordance with the present invention, an optical device 64 formed on the light path of the light source 62 for proper treating and extracting the light, and a power supply 66 for providing power to the light source 62.

Figure 7:
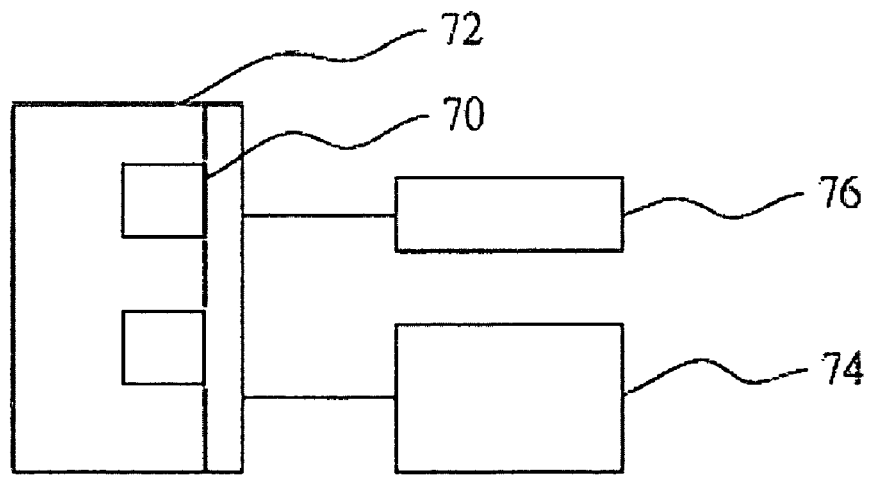
FIG. 7 shows an illumination apparatus containing one embodiment of the present disclosure.

FIG. 7 shows an illumination apparatus containing one embodiment in accordance with the present invention. The illumination apparatus 700 comprises an automobile light, a street light, a flash light, or an indicating light. The illumination apparatus 700 comprises a light source 70 including an optoelectronic device 72 as described in any of the above-mentioned optoelectronic device in accordance with the present invention, a power supply 74 for providing power to the light source 70, and a control device 76 for controlling the power supply 74 and the light source 70.

It will be apparent to those having ordinary skill in the art that various modifications and variations can be made to the methods in accordance with the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A wavelength converting material comprising metal haloaluminate compound, wherein the metal haloaluminate compound is excited to radiate light with wavelength between 550 nm and 650 nm.

2. The wavelength converting material according to claim 1, wherein the metal haloaluminate compound has a chemical formula of $M_{w-p}Al_yO_zX_q:R_p$, wherein w,y,z,q>0, $0.005 \leq p \leq 0.5$, and q=2w+3y−2z; wherein M is at least one element selected from the group of Be, Mg, Ca, Sr, Ba and Zn; X is at least one element selected from the group of F, Cl, Br, and I; R is one or more elements selected from the group of the transition metals and at least one element selected from the lanthanide series.

3. The wavelength converting material according to claim 1, wherein the metal haloaluminate compound is capable of being excited by UV or near-UV light.

4. The wavelength converting material according to claim 1, wherein the metal haloaluminate compound is capable of being excited by light with wavelength between 200 nm and 450 nm.

5. The wavelength converting material according to claim 1, wherein the metal haloaluminate compound is excited to radiate yellow light.

6. An optoelectronic device comprising:
a light-emitting stack;
a wavelength converting material formed on the light-emitting stack; and
an electrode formed on the light-emitting stack;
wherein the wavelength converting material comprises metal haloaluminate compound, and the metal haloaluminate compound is capable of being excited by light with wavelength between 200 nm and 450 nm to radiate light with wavelength between 550 nm and 650 nm.

7. The optoelectronic device according to claim 6, wherein the light-emitting stack comprises:
a first conductivity-type semiconductor layer;
an active layer on the first conductivity-type semiconductor layer; and
a second conductivity-type semiconductor layer on the active layer.

8. The optoelectronic device according to claim 6, wherein the light-emitting stack emits light with wavelength between 200 nm and 450 nm.

9. The optoelectronic device according to claim 6, wherein the metal haloaluminate compound has a chemical formula of $M_{w-p}Al_yO_zX_q:R_p$, wherein w,y,z,q>0, $0.005 \leq p \leq 0.5$, and q=2w+3y−2z; wherein M is at least one element selected from the group of Be, Mg, Ca, Sr, Ba and Zn; X is at least one element selected from the group of F, Cl, Br, and I; R is one or more elements selected from the group of the transition metals and at least one element selected from the lanthanide series.

10. The optoelectronic device according to claim 9, wherein the wavelength converting material further comprises a phosphor capable of being excited by UV light to radiate blue light.

11. The optoelectronic device according to claim 10, wherein the phosphor capable of being excited by UV light to radiate blue light comprises one material selected from the group consisting of $Si_3MgSi_2O_8$:Eu, $BaMgAl_{10}O_{17}$:Eu, (Sr-BaCa)$_5$(PO$_4$)$_3$Cl:Eu, and $Sr_4Al_{14}O_{25}$:Eu.

12. An optoelectronic device comprising:
a printed circuit board comprising a circuit thereon;
an LED chip on the printed circuit board;
a transparent encapsulating material on the printed circuit board and covering the LED chip; and
a plurality of wavelength converting materials distributed in the transparent encapsulating material;
wherein the wavelength converting materials comprise metal haloaluminate compound capable of being excited by light with wavelength between 200 and 450 nm to radiate light with wavelength between 550 and 650 nm.

13. The optoelectronic device according to claim 12, further comprising a metal wire electrically connecting the circuit and the LED chip.

14. The optoelectronic device according to claim 12, wherein the LED chip emits light with wavelength between 200 nm and 450 nm.

15. The optoelectronic device according to claim 12, wherein the metal haloaluminate compound has a chemical formula of $M_{w-p}Al_yO_zX_q:R_p$, wherein w,y,z,q>0, $0.005 \leq p \leq 0.5$, and q=2w+3y−2z; wherein M is at least one element selected from the group of Be, Mg, Ca, Sr, Ba and Zn; X is at least one element selected from the group of F, Cl, Br, and I; R is one or more elements selected from the group of the transition metals and at least one element selected from the lanthanide series.

16. The optoelectronic device according to claim 12, wherein the wavelength converting material further comprises a phosphor capable of being excited by UV light to radiate blue light.

17. The optoelectronic device according to claim 16, wherein the phosphor capable of being excited by UV light to radiate blue light comprises one material selected from the group consisting of $Si_3MgSi_2O_8$:Eu, $BaMgAl_{10}O_{17}$:Eu, (Sr-BaCa)$_5$(PO$_4$)$_3$Cl:Eu, and $Sr_4Al_{14}O_{25}$:Eu.

* * * * *